United States Patent [19]
Suzuki et al.

[11] Patent Number: 5,601,764
[45] Date of Patent: Feb. 11, 1997

[54] PROCESS FOR MAKING TIC-BASE/SIC WHISKER COMPOSITE CERAMIC CUTTING TOOLS

[75] Inventors: Junichiro Suzuki; Shoji Sakakibara; Akiyasu Okuno; Masakazu Watanabe, all of Nagoya, Japan

[73] Assignee: NGK Spark Plug Co., Ltd., Nagoya, Japan

[21] Appl. No.: 512,636

[22] Filed: Aug. 8, 1995

Related U.S. Application Data

[62] Division of Ser. No. 131,571, Oct. 4, 1993, Pat. No. 5,439,854, which is a continuation of Ser. No. 78,496, Jul. 28, 1987, abandoned.

[30] Foreign Application Priority Data

| Jul. 31, 1986 | [JP] | Japan | 61-178834 |
| Aug. 15, 1986 | [JP] | Japan | 61-190483 |
| Oct. 6, 1986 | [JP] | Japan | 61-236077 |
| Oct. 6, 1986 | [JP] | Japan | 61-237593 |

[51] Int. Cl.⁶ .................................. C04B 35/52
[52] U.S. Cl. ................. 264/40.1; 264/60; 501/91
[58] Field of Search ................. 264/60, 40.1; 501/91

[56] References Cited

U.S. PATENT DOCUMENTS

| 2,356,009 | 8/1944 | Schwarzkopf | 501/87 |
| 2,507,218 | 5/1950 | Oswald | 501/87 |
| 2,849,305 | 8/1958 | Frost | 501/87 |
| 3,679,442 | 7/1972 | Beiyna | 501/87 |
| 3,886,254 | 5/1975 | Tanaka et al. | 501/87 |
| 4,063,908 | 12/1977 | Ogawa et al. | 501/87 |
| 4,132,534 | 1/1979 | Valdsoar | 501/87 |
| 4,341,965 | 7/1982 | Okuo et al. | |
| 4,490,319 | 12/1984 | Lee et al. | 501/87 |
| 4,507,224 | 3/1985 | Toibana et al. | 501/88 |
| 4,543,345 | 9/1985 | Wei | 501/95 |
| 4,554,197 | 11/1985 | Chyung et al. | |
| 4,585,500 | 4/1986 | Minjolle et al. | |
| 4,594,106 | 6/1986 | Tanaka et al. | |
| 4,673,658 | 6/1987 | Gadkaree et al. | |
| 4,975,302 | 12/1990 | Sugihara et al. | 427/215 |
| 5,059,564 | 10/1991 | Mehrotra et al. | 501/89 |
| 5,123,935 | 6/1992 | Kanamaru et al. | 51/309 |
| 5,322,823 | 6/1994 | Ueda et al. | 501/89 |
| 5,439,854 | 8/1995 | Suzuki et al. | 501/91 |
| 5,498,855 | 3/1996 | Deevi et al. | 219/553 |

FOREIGN PATENT DOCUMENTS

| 0133864 | 3/1985 | European Pat. Off. |
| 61-26564 | 2/1986 | Japan |
| 61-274803 | 12/1986 | Japan |
| 86/05480 | 3/1986 | WIPO |

OTHER PUBLICATIONS

Richarson, "Modern Ceramic Eng.," Marcel Dekker, Inc., New York, 1984, p. 263.

*Primary Examiner*—Christopher A. Fiorilla
*Attorney, Agent, or Firm*—Fish & Richardson, P.C.

[57] ABSTRACT

A ceramic cutting tool of a TiC-based sintered body containing 40 wt % or more of TiC, and 5 to 40 wt % of SiC whisker uniformly dispersed in the sintered body, said SiC whisker having a diameter of 0.2–1.5 μm and a length of 1–20 μm. The sintered body may include up to 40 wt % of $Al_2O_3$, and may further contain sintering aid.

Up to 40% by weight of TiC may be substituted with at least one of Ti, nitrides, oxides and borides of Ti, and solid-solution of said nitrides, oxides and borides of Ti to form a TiC-base composition.

The TiC-base composition may be represented by $(Ti_aM_b)(C_cN_dO_eB_f)_g$ where: M denotes at least one of transition metal elements of Groups IVa, Va and VIa, except Ti, according to the International Periodic Table; and a+b=1, $0<b\leq0.5$, c+d+e+f=1, $0.5\leq c\leq 1.0$, $0\leq d\leq 0.5$, $0\leq e\leq 0.3$, $0\leq f\leq 0.5$, $0.6\leq g\leq 1.1$.

19 Claims, 1 Drawing Sheet

5,601,764

PROCESS FOR MAKING TIC-BASE/SIC WHISKER COMPOSITE CERAMIC CUTTING TOOLS

This application is a division of U.S. application Ser. No. 08/131,571, filed Oct. 4, 1993, now U.S. Pat. No. 5,439,854, which is a continuation of U.S. application Ser. No. 07/078,496, filed Jul. 28, 1987, now abandoned.

FIELD OF THE INVENTION

This invention relates to TiC-base/SiC whisker composite ceramic cutting tools having high toughness, and a method for producing the same. More particularly, it is concerned with a TiC base/SiC whisker composite sintered body best suited for cutting tools, inter alia, cutting tools for high speed cutting of difficult-to-cut materials such as ductile cast iron.

BACKGROUND

Heretofore, TiC has been known to be a high temperature material having excellent anti-spalling property, because of its high melting point and high hardness, of its low thermal expansion, and of its sustained heat-conductivity even at high temperatures. In view, however, of the fact that TiC is a material difficult to be sintered, it has been a general practice to use the material in the form of a cermet which is obtained by adding to TiC various metals such as Co, Ni and so forth, so as to be sintered in high density, although the addition of such metals has a disadvantage of deteriorating heat-resistance of the material.

For example, in the cutting of ductile cast iron, a cermet tip (or insert) utilizing the abovementioned cermet is employed for the finishing cut. Even such finishing cut, however, would bring about rapid wear at such high cutting speed that exceeds 300 m/min., cause cratered wear, and further tend to readily form chipping. At a cutting speed ranging from 150 to 200 m/min., or slower than that, fusion-adhesion takes place, if not to a degree for tips of super-hard (cemented) materials, to unavoidably roughen the finished surface of the work as cut.

The present inventors have previously proposed a TiC-based ceramic material which, by rendering a metal to assume a state of solid-solution in TiC, is made excellent in the heat-resistance and prevents detrimental effect caused by the metal component at a high temperature (vide: Japanese Patent Kokai Publication No. 61-26564 and Japanese Patent Application No. 60-173519 now JP-Patent-Kokai Publication No. 62-36065).

However, the abovementioned TiC-based ceramic material is inferior to cermet in respect of its toughness, hence the range of its utility has been limited.

Techniques of including the whiskers in the ceramics have generally been disclosed in Japanese Patent Kokai Publication No. 59-102861 (for the purpose of imparting high electric conductivity), and in U.S. Pat. No. 4,543,345 (for the purpose of imparting toughness). JP Kokai No. 59-102861 discloses oxide ceramics such as $Al_2O_3$, $ZrO_2$, MgO as the matrix, while U.S. Pat. No. 4,543,345 discloses matrix of $Al_2O_3$, mullite or $B_4C$. However, these techniques do not provide sufficient compatibility and bonding force between SiC whisker and the matrix.

Thus there has been much to be desired in the art to provide a still improved ceramic-base/SiC whisker composite ceramic body, particularly suitable for cutting tools.

SUMMARY OF THE DISCLOSURE

It is therefore a primary object of the present invention to provide a ceramic sintered body having high toughness and excellent heat-resistance.

It is another object of the present invention to provide a cutting tool suitable for cutting various metallic and non-metallic cutting material at a high speed.

It is still another object of the present invention to provide a method for manufacturing the abovementioned sintered body and cutting tool.

Still further objects of the present invention will become apparent in the entire disclosure.

With a view to attaining the abovementioned objects, the present inventors have strenuously conducted researches and studies, as the result of which they have found out that, by uniformly dispersing SiC whisker having high strength, high heat-resistance and high heat-conductivity in the TiC-base ceramics, its toughness could be improved, while still maintaining its heat-resistance.

The TiC-base/SiC whisker composite ceramics according to the present invention, in which Ti is the Group IVa element, is excellent in its compatibility with Si which is the Group IVb element, hence the excellent mechanical strength of the SiC whisker can be taken advantage of.

According to a first aspect of the present invention, there is provided a ceramic cutting tool comprising a TiC-based sintered body consisting essentially of 40% by weight or more of TiC, and 5 to 40% by weight of SiC whisker uniformly dispersed in said sintered body, said SiC whisker having a diameter of 0.2–1.5 μm and a length of 1–20 μm.

According to a second aspect of the present invention there is provided a ceramic cutting tool, wherein said sintered body further comprises no more than 40% by weight (preferably 0.5 to 40%) of $Al_2O_3$.

According to the third aspect of the present invention there is provided a ceramic cutting tool, wherein said sintered body further comprises no more than 19% by weight (preferably 0.03 to 19% by weight, more preferably 0.05 to 10% by weight) of at least one sintering aid selected from the group consisting of AlN and oxides of Mg, Ca, Si, Zr, Ni, Y and rare earth metals (preferably oxides).

According to a fourth aspect of the present invention, there is provided a ceramic cutting tool, wherein no more than 40% (preferably no more than 30%) by weight of TiC is substituted with at least one selected from the group consisting of Ti, nitrides, oxides and borides of Ti, and solid-solution of said nitrides, oxides and borides of Ti.

According to a fifth aspect of the present invention, there is provided a ceramic cutting tool which is obtained by sintering a mixture consisting essentially of 5 to 40% by weight of sic whisker, 10% by weight or below of a sintering aid, and the balance being a TiC-base composition represented by the following formula in atomic fraction: $(Ti_aM_b)(C_cN_dO_eB_f)_g$ where: M denotes at least one of transition metal elements of Groups IVa, Va and VIa, except Ti, according to the International Periodic Table; and $a+b=1$, $0<b\leq0.5$, $c+d+e+f=1$, $0.5\leq c\leq 1.0$, $0\leq d\leq 0.5$, $0\leq e\leq 0.3$, $0\leq f\leq 0.5$, $0.6\leq g\leq 1.1$.

The TiC-base $(Ti_aM_b)(C_cN_dO_eB_f)_g$ composition is preferably at least 40% by weight of the sintered body.

The sintering aid is the same as those mentioned in the third aspect except Zr oxide. The SiC whisker should be those mentioned in the first aspect. The IVa group includes Zr and Hf; the Va group includes V, Nb and Ta; and the VIa group includes Cr, Mo and W. In this aspect, $Al_2O_3$ may be incorporated as mentioned in the second aspect. The ($Ti_aM_b$) components preferably include those mentioned in the fourth aspect. The sintering may be carried out in a non-oxidizing atmosphere at a temperature ranging from 1,500° C. to 2,000° C. (preferably 1,700° to 2,000° C., more preferably 1,700° to 1,900° C.).

According to a sixth aspect of the present invention there is provided a process for producing a ceramic cutting tool, which comprises steps of: providing a mixture by uniformly dispersing and mixing 5 to 40% by weight of SiC whisker in and with at least 40% by weight of TiC component, no more than 40% by weight of $Al_2O_3$, and no more than 19% by weight of at least one component as a sintering aid which is selected from the group consisting of oxides of Mg, Ca, Si, Zr, Ni and rare earth metals; compacting the mixture, and sintering the compact in a non-oxidizing atmosphere at a temperature ranging from 1,500° C. to 2,000° C. (preferably 1,700° to 2,000° C., more preferably 1,700° to 1,900° C.).

The TiC in the TiC component is preferably substituted with certain substances as mentioned at the fourth aspect. Where metallic Ti is used, the sintering should be continued until a metallic phase of Ti cannot be detected by X-ray diffractometry. The SiC whisker should be adjusted to have the specified diameter and length as mentioned at the first aspect, e.g., by milling or pulverizing or the like measure.

The process preferably comprises steps of: uniformly dispersing and mixing 5 to 50 parts by weight of SiC whisker into and with 100 parts by weight of a TiC-based composition consisting of 40 to 94.95% by weight of $Al_2O_3$, and 0.05 to 20% by weight of at least one component as a sintering aid selected from the group consisting of oxides of Mg, Ca, Si, Zr, Ni and rare earth metals; and sintering said mixture (or compact thereof) in a non-oxidizing atmosphere at a temperature ranging from 1,700° C. to 2,000° C.

The foregoing objects, other objects as well as the particular ingredients to be used and the conditions for their treatment according to the present invention will become more apparent and understandable from the entire disclosure.

DESCRIPTION OF THE PREFERRED EMBODIMENTS

Figure 1:
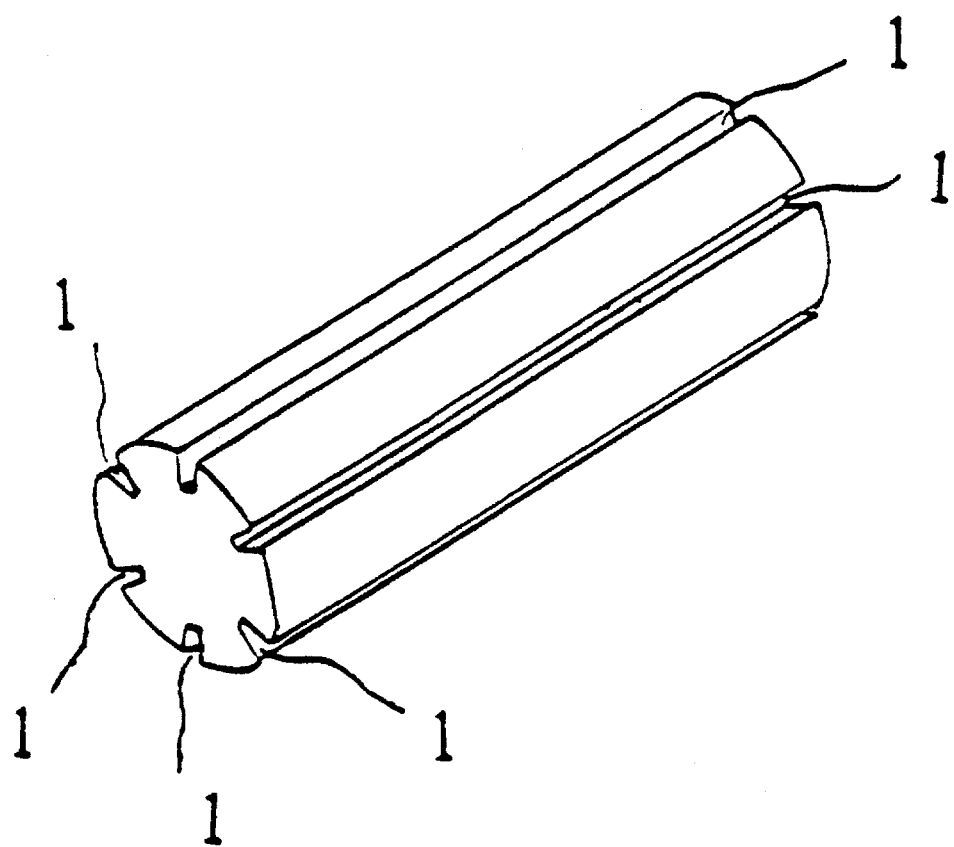

In the drawing:

The single FIG. 1 is a perspective view showing one example of a material to be cut for testing the capability of the ceramic sintered body according to the present invention.

DESCRIPTION OF THE PREFERRED EMBODIMENTS

Throughout this specification, the elements are defined by the International Periodic Table; the compositional ratio is denoted by "% by weight" unless otherwise specified.

In the sintered body according to the present invention, TiC or TiC component with substituent, expressed by $TiC_x$ (generally referred to as "TiC component") is the cardinal component constituting the matrix in the sintered body, the amount thereof being a balance from the total composition, which should preferably be 40% or above, or more preferably 50% or more, or no more than 70%, in order to take advantage of the TiC component, namely TiC-based ceramics.

Particularly preferable is a ceramic composition, in which TiC or TiC component constitutes a continuous matrix phase.

The quantity of SiC whisker to be added to the TiC-based composition may be in a range of 5 to 40% in the sintered body (preferably about 5 to about 33% in the sintered body which corresponds to about 5 to 50 wt parts with respect to 100 wt parts of the ceramic material of the abovementioned composition). With the SiC whisker not reaching 5%, there will be no effect to the anti-chipping property. On the contrary, with its exceeding 40%, there appear unfavorable results such that uniform dispersibility of the component lowers due to anisotropy of the SiC whisker, hence lowering in the sintrability and anti-chipping property are brought about. The SiC whisker amount is further preferred at 10 to 30%, or most preferred at 10–20% in the entire sintered body.

As regards the SiC whisker, it has following effects. Since the SiC whisker itself has a tensile strength of 1,000 $kg/mm^2$, if it is uniformly dispersed in the sintered body, there will be obtained not only improvement in its mechanical strength and toughness, but also remarkable improvement in hardness. For this purpose, the content of TiC should be 40% or more, and that of SiC whisker ranges from 5 to 40% in the sintered body, respectively, which would produces the ceramic sintered body excellent in its various characteristics. With the SiC whisker being less than 5%, there will be no effect of improvement in the mechanical strength and toughness of the ceramic material. On the contrary, when its content exceeds 40%, the sintrability of the ceramic material becomes poor, and its mechanical strength becomes unfavorably lowered.

The SiC whisker dispersed in the sintered body should have a size of 0.1 to 1.5 μm in diameter and 1 to 20 μm in length. With the whisker having its diameter of below 0.2 μm, the reinforcing effect due to the whisker is insufficient. On the contrary, with the SiC whisker having its diameter exceeding 1.5 μm, it is difficult to obtain the sintered body of good quality having less defects in it, hence uneconomical. Further, with the SiC whisker having its length of below 1 μm, absorption efficiency of the energy of fracture such as bending of cracks, pull-out of whisker, etc. is poor with the consequence that the effect of improvement in the toughness of the ceramic material becomes poor. With the whisker having its length of over 20 μm, it becomes difficult to uniformly disperse such whisker in the sintered body by the ordinary method of producing the sintered body. In more details, agglomerated body of the whisker tends to occur easily, which unfavorably brings about decrease in the strength of the sintered body. A diameter of 0.4 to 1.0 μm and a length of 1 to 15 μm (more preferred is 1 to 10 μm) are preferred for the SiC whisker, and an aspect ratio of 1.5 to 30 is preferred (more preferred is 1.5 to 20).

The crystallographic type of the SiC whisker may be either α-type or β-type, which can only be dispersed uniformly in the sintered body.

The substituent for Ti contained in TiC component should be rendered a solid-solution in TiC in the course of sintering so that it may not remain substantially in the ceramic material as the metal phase (e.g., when metallic Ti is used as the substituent). With such Ti in solid-solution, TiC takes a non-stoichiometrical composition ($TiC_x$) to cause the crystallographic structure to be incomplete and unstable, which facilitates the sintering reaction such as the solid phase reaction, and so forth. As the result of this, it is considered that the sintrability of the ceramic material according to the present invention is improved. This phenomenon also signifies that the grain boundary between $Al_2O_3$ and TiC, or among the grains of TiC becomes reinforced. In order to impart the above-mentioned characteristic to the ceramic material, metallic Ti may be used in substitution for 30% or below of TiC. When the amount of Ti exceeds 30% of TiC, there will be a possibility of Ti remaining as the metal phase, with the consequent lowering of the wear-resistant property of the ceramic material from the standpoint of its cutting performance. In the course of sintering, Ti is required to be rendered a solid-solution in TiC to such an extent that it may not be detected as the metal phase by at least the X-ray diffractometry. Presence of the metal phase which is small enough as to not being detected by the X-ray diffractometry, but is in a quantity of an extent such that it can be identified through an optical microscope does not give rise to a problem, since Ti in such amount gives no influence on the performance of the ceramic cutting tool.

As to the second aspect of the present invention, by the dispersion of $Al_2O_3$, the heat-resistance and the wear-resistance of the ceramic material can be improved. $Al_2O_3$ is a chemically stable substance, which is excellent in its anti-oxidation property and has a low free energy of formation. Such $Al_2O_3$ is dispersed in the TiC component to improve the anti-oxidation property and the chemical stability of the ceramic material as a whole. By this dispersion of $Al_2O_3$, there may further be added the anti-oxidation property and the chemical stability to those various excellent properties of TiC, whereby more excellent characteristics of the ceramic material are obtained. $Al_2O_3$ has also a function of the sintering aid to the TiC component. $Al_2O_3$ may be present up to 40% in the sintered body. However, when it is added to the ceramic composition in a quantity ranging from 0.5 to 40%, it is possible (thus preferred) to attain a satisfactory result in respect of the abovementioned anti-oxidation property and the chemical stability. When $Al_2O_3$ is added in a quantity below 0.5%, the resulting effect is not satisfactory. On the contrary, when it exceeds 40%, a negative effect will appear in displaying the characteristic of TiC. The $Al_2O_3$ amount is more preferably 5 to 30%.

One or more compounds selected from AlN, oxides of Mg, Ca, Si, Zr, Ni, Y and rare earth metals may be used as the sintering aids in a quantity ranging from 0.03 to 19%* (preferably 0.05 to 10%, more preferably 0.5 to 5%) in the sintered body. (*N.B. This corresponds to the amount of 0.05 to 20% in the TiC base composition except SiC whisker.) With the compound being below 0.03%, the abovementioned effect does not come out sufficiently. On the contrary, when its quantity exceeds 19%, a large amount of metal oxides as the sintering aid would lower the characteristics of TiC, in particular, the wear-resistance or high temperature characteristics. By the way, even when Mg, Ca, Si, Zr, Ni, Y and rare earth metals are added to the ceramic composition as the other compounds than the oxides, such as in the form of the nitrides, carbides, etc., they are also able to produce the effect as the sintering aid. However, when they are combined with $Al_2O_3$, it is preferable to select those which are effective as the sintering aid for $Al_2O_3$ per se. The above-listed oxides of Mg, Ca, Si, Zr, Ni, Y and rare earth metals correspond to such effective sintering aids.

When a part of TiC, i.e., less than 40% thereof, is substituted with an oxide, nitride, boride of Ti, or solid-solution of these, the wear-resistant property, anti-chipping property, or sintrability of the ceramic material can be improved much more. (Note, the term "TiC component" encompasses those with substituents for TIC). Of these, the nitride of Ti is able to readily become solid-solution in TiC to improve toughness of TiC per se, and, at the same time, widen it is co-present with $Al_2O_3$, it also functions as the sintering aid for $Al_2O_3$ to thereby further improve the sinterability of the ceramic material. Boride of Ti has itself hardness, by the addition of which the wear-resistance of the sintered body improves. Solid-solution of any two or more of oxides, nitrides, and borides of Ti (also including carbides) has in itself the abovementioned effect of each compound in combination. Therefore, the addition of such solid-solutions produces the same resulting effect as in the case of adding each of these compounds singly. When Ti in metallic form is added to TiC, it becomes a solid-solution in it with the result that TiC assumes a non-stoichiometric composition (TiCx), whereby the crystallographic structure of TiCx becomes incomplete and instable to make it possible to improve sinterability of the ceramic material. Also, concerning the high temperature strength of TiCx per se, it may be considered that the mechanical strength and the toughness thereof improve by the form of bonding, in which its inherent covalent bonds assumes a property of the metallic bond. It should be noted here that metallic Ti or nitrides, oxides, borides of Ti, or solid-solution of these compounds, which are to be added for substituting a part of TiC, may be limited to a quantity of 40% or less with respect to TiC, for obtaining various effects. As the quantity of the solid-solution increases beyond 40%, the characteristics of TiC itself will be lost unfavorably. Such substituent is preferably no more than 30% of the TiC component, particularly for the metallic Ti.

As regards the fifth aspect of the present invention, it may be as follows. That is to say, its characteristic is to use a composition as the starting mixture represented by the following formula: $(Ti_aM_b)(C_cN_dO_eB_f)_g$ in atomic fraction.

In particular, the transition metals M in Group IVa, Va and VIa of the Periodic Table assumes a solid-solution in TiC to reinforce TiC to be the principal component of the ceramic material. In addition, these transition metals combine with boron, oxygen, etc. to remain in the sintered body, and exhibit excellent affinity for TiC for achieving the dispersion reinforcement or hardening. Above all, Zr and Hf become a solid-solution to increase hardness of the sintered body (note Zr oxide may serve as the sintering aid, too), and contribute to improvement in the toughness thereof through a phase-transformation due to addition of oxides. V functions to inhibit the grain growth and increases hardness of the sintered body. Nb and Ta improve the high temperature strength of the sintered body. Cr improves hardness and sinterability and absorbs impurities of Fe, Ni, Co or the like. Mo and W, besides increasing toughness, becomes a solid-solution in TiC to also increase hardness of the sintered body. When these transition metals, however, become greater in quantity than Ti in terms of mole ratio, the quantity of Ti decreases relatively to become unable to exhibit the excellent characteristics of TiC proper, hence the atomic fraction is set in a range of $0<b\leq0.5$.

Of those light (or nonmetallic) elements such as C, N, O and B, O functions to improve hardness of the ceramic material when it becomes solid-solution in TiC, to increase affinity between TiC and oxides such as $Al_2O_3$. When it remains in the form of oxides, they contribute to increase hardness and toughness. However, when its atomic fraction exceeds 0.3 with respect to the entire light element, the toughness of the sintered body decreases to the contrary, so that the atomic fraction is set to be $0\leq e\leq0.3$. N, when it assumes a solid-solution in TiC, contributes to increase toughness. Even if it does not assume solid-solution, it remains in the form of nitride to contribute to improvement in toughness and wear-resistant characteristic of the ceramic material. When its atomic fraction exceeds 0.5 with respect to the entire light element, however, the ceramic material loses its hardness, hence its atomic fraction is set to be $0 \leq d \leq 0.5$. B is difficult to assume a solid-solution in TiC. However, a part thereof becomes a solid-solution to increase hardness of the ceramic material. Besides this, when it remains in the form of borides, it contributes to increase hardness of the ceramic material. However, when its atomic fraction exceeds 0.5 with respect to the entire light element, the toughness of the ceramic material will become lowered, hence its atomic fraction is set to be $0 \leq f \leq 0.5$.

When the total atomic fraction of the light elements exceeds 1.1 with respect to the total transition metal including TiC, there will be deposited an isolated light element to bring about generation of pores, decrease in the toughness, etc. On the other hand, if the total atomic fraction of the light elements does not reach 0.6, there will precipitate or be present other compounds to bring about lowering in the high temperature characteristic of the ceramic material, hence the total atomic fraction of the light elements is set to be $0.6 \leq g \leq 1.1$.

The SiC whisker functions to improve toughness and heat-conductivity of the ceramic material. When its content is below 5%, no satisfactory function thereof can be attained. On the other hand, when its content exceeds 40%, the sintrability and wear-resistance of the ceramic material would decrease.

As regard, $Al_2O_3$, the same thing as mentioned in the second aspect will apply. The sintering aid may be present as previously mentioned.

As regards the sintered body relative to these first to fifth aspects of the present invention, its theoretical relative density should preferably be 97% or above, or more preferably 99% or above. Its average crystal grain size should preferably be 10 μm or below, or more preferably 5 μm or below.

According to the sixth aspect of the present invention relating to the manufacturing process of the TiC-base/SiC whisker composite ceramic cutting tools, various methods may be adopted for the manufacture of the sintered body. That is to say, for the sintering method, there may be employed, for example, normal sintering method (N.S), hot-pressing method (H.P.), and hot-isostatic pressing method (H.I.P.). The atmosphere for the sintering should preferably be a non-oxidizing gas, and the pressure therefor may be arbitrarily selected from 0.01 to 2,000 atm. The sintering temperature may be 1,500° to 2,000° C., preferably 1,700° to 2,000° C., more preferably 1,700° to 1,900° C., in a nonoxidizing atmosphere.

The ceramic cutting tools according to the present invention are highly suitable for cutting, in particular, high speed cutting. Tools for the successful cutting is in a wide range such as ferrous metals, e.g., cast iron, steel; non-ferrous metals, e.g., high nickel, aluminum, titanium; and non-metals. Above all, the ceramic cutting tools of the present invention are suited for cutting difficult-to-cut works such as ductile cast iron (which has been recognized by those skilled in this field of art to be one of the most difficult to cut among various cast iron). Also, the ceramic cutting tools according to the present invention are useful for mechanical tools and parts which require wear-resistance, corrosion-resistance, heat-resistance, etc.

Certain inevitable impurities might be entrained through the starting materials or process of the production, e.g., Fe, Co, etc.

With a view to enabling those persons skilled in the art to put the present invention into practice, the following preferred examples are presented. It should, however, be noted that these examples are illustrative only and not so restrictive, and that various changes and modifications may be made by those skilled persons in the art in the ingredients used and the conditions for sintering without departing from the spirit and scope of the present invention as recited in the appended claims.

EXAMPLE 1

$\alpha$-$Al_2O_3$ containing 70% of its particle size of 1 μm or below, TiC of its average particle size of 1.1 μm, Ti having its particle size which passed through a 325-mesh sieve, and a sintering aid(s) having its purity of 99.5% or above were mixed at various ratios as indicated by Specimen Nos. in Table 1 below, and each of the mixtures was milled in a stainless steel ball mill for 30 hours together with acetone. Thereafter, acetone was evaporated in a dryer, followed by pulverization of the dried mixture to prepare a base powder all passing through a 60 mesh sieve.

After this, SiC whisker ("SC-9"—a product of ARCO Chemical) having a diameter of 0.6 μm and a length of 10–80 μm was added to the base powder at various ratios as indicated by Specimen Nos. in Table 1 below, and uniformly mixed and dispersed in an $Al_2O_3$ ball mill for 24 hours together with ethanol, after which ethanol was evaporated to dry the mixture and then the mixture was caused to pass through a 60-mesh sieve to thereby obtain the base powder. The length of the SiC whisker became below 20 μm.

The thus obtained base powder was sintered at various sintering temperatures and sintering methods as shown in Table 1 below.

The actual conditions for sintering were as follows:

a) normal sintering (N.S.)—two-hour sintering in an argon atmosphere;

b) hot-pressing (H.P.)—30-minute sintering in a graphite mold under a pressure of 200 kg/cm$^2$; and c) hot-isostatic-pressing (H.I.P.)—one-hour preliminary normal sintering (at temperatures shown in the Table) conducted in an argon atmosphere, followed by further 2.5-hour HIP sintering at a temperature of 1500° to 1800° C. and under a pressure of 1,500 atmosphere.

Each of the sintered bodies was polished by a diamond grinding wheel to the quality of "SNGN 432 TN" and to a surface smoothness of 0.8 S or below (according to JIS—Japanese Industrial Standard), followed by measuring the density relative to the theoretical density, and hardness. Also, the state of Ti in the sintered body was examined by an X-ray diffraction apparatus.

Same measurements and examination were conducted on the comparative examples. TiC cermet used is one available in ordinary market.

Note in all the Tables the sintering temperatures for HIP designate those for the preliminary normal sintering.

TABLE 1

| | | TiC Base Composition (100 parts) | | | | SiC Whisker (parts) | Sintering Method | Sintering Temp. (°C.) | Relative Theoretical Density (%) | Hardness (Rockwell 45N Scale) | Metallic Phase of Ti (X-ray Diffraction) |
|---|---|---|---|---|---|---|---|---|---|---|---|
| Sample No. | TiC (wt %) | Substituted Ti for TiC (wt %) | $Al_2O_3$ (wt %) | Sintering Aids (wt %) | | | | | | | |
| Example 1 | 50 | 0 | 30 | MgO | 15 | $ZrO_2$ | 5 | 5 | N.S. | 1800 | 98.1 | 90.5 | Absent |
| 2 | 70 | 0 | 15 | CaO | 5 | $Y_2O_3$ | 10 | 8 | " | 1850 | 97.5 | 90.0 | " |
| 3 | 85 | 24.1 | 10 | $Er_2O_3$ | 5 | | | 10 | " | 1800 | 98.5 | 90.5 | " |
| 4 | 62 | 11.9 | 30 | MgO | 4 | $Dy_2O_3$ | 4 | 10 | H.P. | 1800 | 98.0 | 90.5 | " |
| 5 | 74 | 0 | 25 | MgO | 1 | | | 10 | " | 1850 | 99.2 | 92.3 | " |
| 6 | 72 | 0 | 27 | MgO | 1 | | | 20 | " | 1900 | 99.5 | 93.5 | " |
| 7 | 79.5 | 21.4 | 20 | CaO | 0.5 | | | 25 | " | 1850 | 99.1 | 92.8 | " |
| 8 | 76 | 14.5 | 23 | MgO | 1 | | | 10 | " | 1800 | 99.3 | 92.3 | " |
| 9 | 79.2 | 12.6 | 20 | $Y_2O_3$ | 0.8 | | | 15 | " | 1850 | 99.2 | 93.3 | " |
| 10 | 89 | 7.9 | 9 | MgO | 1 | $Y_2O_3$ | 1 | 30 | " | 1950 | 98.5 | 93.8 | " |
| 11 | 83.5 | 15.6 | 15 | CaO | 5 | $Dy_2O_3$ | 0.5 | 50 | " | 1950 | 97.5 | 92.1 | " |
| 12 | 75 | 0 | 10 | CaO | 5 | $Y_2O_3$ | 10 | 5 | HIP | 1750 | 99.3 | 91.5 | " |
| 13 | 70 | 0 | 15 | MgO | 10 | $Dy_2O_3$ | 10 | 20 | " | 1850 | 99.5 | 93.0 | " |
| 14 | 78 | 15.9 | 10 | $Dy_2O_3$ | 5 | NiO | 2 | 15 | " | 1800 | 99.4 | 92.1 | " |
| 15 | 70 | 9.2 | 20 | CaO | 8 | $Y_2O_3$ | 5 | 20 | " | 1850 | 99.1 | 92.5 | " |
| 16 | 64 | 10.2 | 25 | MgO | 4 | $Dy_2O_3$ | 3 | 15 | " | 1850 | 99.6 | 92.2 | " |
| 17 | 82 | 22.0 | 10 | CaO | 3 | $Ho_2O_3$ | 4 | 10 | " | 1800 | 99.7 | 92.4 | " |
| 18 | 90 | 18.2 | 7 | $Dy_2O_3$ | 3 | | | 5 | " | 1800 | 99.1 | 91.8 | " |
| Comparison 1 | 45 | 6.8 | 45 | MgO | 3 | $Y_2O_3$ | 7 | 10 | N.S. | 1800 | 98.1 | 90.4 | Present |
| 2 | 88.5 | 31.0 | 10 | MgO | 1 | CaO | 0.5 | 20 | " | 1800 | 99.7 | 91.2 | Absent |
| 3 | 79 | 0 | 20 | MgO | 1 | | | 10 | HIP | 2050 | 99.7 | 90.3 | " |
| 4 | 55 | 8.3 | 20 | CaO | 10 | $Y_2O_3$ | 15 | 15 | HIP | 1800 | 99.7 | 91.8 | Present |
| 5 | 82 | 22.7 | 15 | NiO | 1 | $ZrO_2$ | 2 | 0 | H.P. | 1750 | 99.3 | 89.5 | " |
| 6 | 79 | 11.9 | 20 | MgO | 1 | | | 10 | " | 1650 | 94.8 | 87.1 | Present |
| 7 | 30 | 0 | 40 | $Dy_2O_3$ | 20 | NiO | 10 | 20 | HIP | 1800 | 95.8 | 89 | Absent |
| 8 | 79 | 15.8 | 8 | MgO | 7 | $Y_2O_3$ | 6 | 15 | " | 1800 | 83.4 | 79 | Present |
| 9 | TiC—TiN—$Mo_2C$—Ni system Cermet | | | | | | | | | 1550 | 100 | 88.1 | Present | wt parts with respect to 100 wt parts of TiC base composition
see Table 6

EXAMPLE 2

The following components were blended in various compositional ratios as shown in Table 3 below: TiC having a particle size of 1 μm; α-$Al_2O_3$ having a particle size of 0.7 μm; $TiB_2$ having a particle size of 6 μm; Ti having a particle size which passed through a 325-mesh sieve; a compound selected from CaO, MgO, $SiO_2$, $ZrO_2$, NiO, $Y_2O_3$, $Dy_2O_3$, $Ho_2O_3$, $TiO_2$ and TiCN, each having a particle size ranging from 0.3 to 2 μm; and SiC whisker shown in Table 2 below. Each of these compositions was mixed uniformly by variously changing the mixing and milling conditions for 0.5 to 48 hours, followed by drying the pulverized mixture. For the purpose of base powder for the normal sintering and the HIP sintering, 3 parts by weight of paraffin was added, and the resultant base powder was was subjected to compacting in a metal mold under a pressure of 1.5 tons/cm². The thus obtained compacts were sintered at a sintering temperature and a sintering method as shown in Table 3.

The actual conditions for the sintering were as follows.

a) normal sintering (N.S.)—one-hour sintering in an argon atmosphere under a reduced pressure;

b) hot-press sintering (H.P.)—15-minute sintering under a pressure of 200 kg/cm² in a graphite mold; and c) hot-isostatic-press sintering (H.I.P.)—one-hour preliminary sintering (at temperatures shown in the Table) in an argon gas atmosphere under a reduced pressure, followed by two-hour hot-isostatic-press sintering under the conditions of 1,500°–1,800° C. and 1,500 atmosphere.

The thus obtained sintered bodies were each examined its characteristics in the same manner as in Example 1 above. The results are shown in Table 5 below.

TABLE 2

| Sign | Type | Diameter (μm) | Length (μm) |
|---|---|---|---|
| A | α | 0.7–1.5 | 10–90 |
| B | α | 0.4–0.7 | 10–80 |
| C | α | 0.08–0.2 | 5–60 |
| D | β | 0.5–0.8 | 10–100 |

TABLE 3

| Sample Nos. | | TiC (wt %) | $Al_2O_3$ (wt %) | Additional Components (wt %) | SiC Whisker Sign | wt % | Length μm | Sintering Method | Sintering Temp. (°C.) | Relative Theoretical Density (%) | Hardness (Rockwell 45N Scale) | Bending Strength (kg/mm²) |
|---|---|---|---|---|---|---|---|---|---|---|---|---|
| Example 2 | 1 | 49 | 30 | 10Ti—2MgO—4$Dy_2O_3$ | A | 5 | 1–10 | N.S | 1800 | 98 | 90.3 | 63 |
| | 2 | 50 | 22 | 15$TiO_2$—5$Y_2O_3$ | A | 8 | 1–8 | " | " | 98 | 90.0 | 60 |
| | 3 | 61 | — | 15Ti—2MgO—2$Dy_2O_3$ | D | 20 | 1–16 | H.P | 1800 | 99 | 91.5 | 75 |
| | 4 | 68.3 | 0.2 | 10Ti—0.5NiO—1$Y_2O_3$ | A | 20 | 1–18 | " | 1900 | 99 | 92.2 | 80 |
| | 5 | 48 | 25 | 6Ti—1CaO | A | 20 | 1–9 | " | 1850 | 100 | 92.1 | 102 |
| | 6 | 45 | 6 | 35TiN—1CaO—3$Y_2O_3$ | B | 10 | 1–10 | " | 1800 | 100 | 90.7 | 92 |
| | 7 | 60 | 20 | 10$TiB_2$—1CaO—1$Dy_2O_3$ | A | 8 | 1–14 | " | 1850 | 100 | 92.0 | 87 |
| | 8 | 41 | 10 | 10TiCN—2MgO—2$Dy_2O_3$ | A | 35 | 1–10 | " | 1850 | 100 | 92.0 | 105 |
| | 9 | 45 | 25 | 8Ti—1MgO—1$Dy_2O_3$ | B | 20 | 1–11 | " | 1850 | 100 | 91.8 | 93 |
| | 10 | 64 | 15 | 15Ti | A | 6 | 1–18 | " | 1850 | 99 | 91.2 | 75 |
| | 11 | 69 | 20 | 3$Dy_2O_3$ | A | 8 | 1–11 | HIP | 1700 | 100 | 90.3 | 79 |
| | 12 | 55 | 20 | 8Ti—1MgO—1$Dy_2O_3$ | A | 15 | 1–7 | " | 1750 | 99 | 91.7 | 96 |
| | 13 | 49 | 20 | 5$ZrO_2$—6$Y_2O_3$ | B | 20 | 1–17 | " | 1700 | 100 | 90.3 | 82 |
| | 14 | 67 | 15 | 5Ti—1MgO—2$Dy_2O_3$ | A | 10 | 1–12 | " | 1700 | 100 | 91.6 | 95 |
| | 15 | 62 | 1 | 13$TiO_2$—1$SiO_2$—3$Dy_2O_3$ | A | 20 | 1–15 | " | 1700 | 100 | 91.5 | 85 |
| | 16 | 62 | 4 | 5$TiB_2$—4$Ho_2O_3$ | B | 25 | 1–18 | " | 1750 | 99 | 91.1 | 80 |
| Comparison 2 | 1 | 61 | 20 | 10$TiB_2$—2$Dy_2O_3$ | C | 7 | 1–17 | HIP | 1700 | 99 | 91.3 | 48 |
| | 2 | 52 | 25 | 10Ti—3$Y_2O_3$ | B | 10 | 0.2–2 | " | 1750 | 99 | 91.6 | 40 |
| | 3 | 42 | 20 | 5Ti—1MgO—2$Y_2O_3$ | A | 30 | 28–75 | " | 1800 | 98 | 90.7 | 43 |
| | 4 | | | Commercial TiC based Cermet | — | — | — | — | — | 100 | 87.3 | 122 |
| | 5 | 45 | 2 | 3CaO | B | 50 | 1–18 | H.P | 1900 | 96 | 92.4 | 68 |
| | 6 | 71 | 20 | 4Ti—2MgO | B | 3 | 1–11 | " | 1800 | 100 | 91.6 | 77 |
| | 7 | 28 | 30 | 8$TiO_2$—4MgO | A | 30 | 1–16 | " | 1850 | 99 | 89.7 | 62 |
| | 8 | 42 | 30 | 15$TiO_2$—5$Y_2O_3$ | A | 8 | 1–8 | N.S | 1800 | 99 | 89.5 | 48 |

EXAMPLE 3

The following ingredients were mixed in various compositional ratios as shown in Table 4 below, and the mixtures were each sintered in the same manner as in Example 2 above, after which the sintered bodies were examined their characteristics: TiC, ZrC, TaC, HfC, TiN, ZrN, TaN, HfN, $Mo_2C$, WC and NbC, each having a particle size ranging from 1.0 to 2.0 μm; $ZrO_2$ and $HfO_2$, each having a particle size of from 0.1 to 0.5 μm; $TiB_2$, $ZrB_2$, $TaB_2$ and WB, each having a particle size of from 3 to 7 μm; Ti, Zr, Ta, V, W, Mo and B, each having a particle size which passed through a 325-mesh sieve; TiCN and WTiC, each having a particle size ranging from 1.0 to 2.5 μm; α-$Al_2O_3$ having a particle size of 0.7 μm; CaO, MgO, $SiO_2$, NiO, $Y_2O_3$, $Dy_2O_3$, $Ho_2O_3$ and AlN, each having a particle size of ranging from 0.3 to 2 μm; —SiC whisker having a diameter of 0.6 μm and a length of from 10 to 80 μm; and β—SiC whisker having a diameter of 0.6 μm and a length of from 10 to 90 μm.

TABLE 4

| Sample Nos. | | Material Amount (wt %) | $(Ti_aM_b)(C_cN_dO_eB_f)_g$ Composition |
|---|---|---|---|
| Example 3 | 1 | 52TiC—6Ta | $(Ti_{0.93}Ta_{0.07})(C_{1.00})_{0.93}$ |
| | 2 | 42TiC—6TiWC—5Ti | $(Ti_{0.98}W_{0.02})(C_{1.00})_{0.79}$ |
| | 3 | 73TiC—7Ti—7ZrO$_2$ | $(Ti_{0.98}Zr_{0.02})(C_{0.94}O_{0.06})_{0.84}$ |
| | 4 | 48TiC—7Ta—8ZrO$_2$ | $(Ti_{0.87}Zr_{0.05}Ta_{0.08})(C_{0.90}B_{0.1})_{0.96}$ |
| | 5 | 58TiC—10HfO$_2$ | $(Ti_{0.97}Hf_{0.03})(C_{0.94}O_{0.06})_{1.03}$ |
| | 6 | 35TiC—8ZrC—10TiCN | $(Ti_{0.91}Zr_{0.09})(C_{0.90}N_{0.10})_{1.00}$ |
| | 7 | 43TiC—5TaN | $(Ti_{0.97}Ta_{0.03})(C_{0.97}N_{0.03})_{1.00}$ |
| | 8 | 42TiC—6Zr—10TiB$_2$—5WB | $(Ti_{0.83}Zr_{0.14}W_{0.03})(C_{0.76}B_{0.24})_{0.96}$ |
| | 9 | 63TiC—5Mo | $(Ti_{0.91}Mo_{0.09})(C_{1.00})_{0.91}$ |
| | 10 | 40TiC—5Ta—10TiB$_2$ | $(Ti_{0.88}Ta_{0.12})(C_{0.91}B_{0.09})_{0.97}$ |
| | 11 | 55TiC—20WC—10Mo$_2$C | $(Ti_{0.85}W_{0.09}Mo_{0.06})(C_{1.0})_{0.97}$ |
| | 12 | 60TiC—5V—5ZrO$_2$ | $(Ti_{0.82}V_{0.02}Zr_{0.16})(C_{0.95}O_{0.05})_{0.87}$ |
| | 13 | 50TiC—10V—20TaN | $(Ti_{0.63}V_{0.30}Ta_{0.07})(C_{0.89}N_{0.11})_{0.71}$ |
| | 14 | 51TiC—5Ti—7HfO$_2$ | $(Ti_{0.98}Hf_{0.02})(C_{0.95}O_{0.05})_{0.83}$ |
| | 15 | 61TiC—5ZrC | $(Ti_{0.95}Zr_{0.05})(C_{1.00})_{1.00}$ |
| | 16 | 45TiC—5TaC—8Nb | $(Ti_{0.79}Ta_{0.03}Nb_{0.18})(C_{1.00})_{0.82}$ |
| | 17 | 55TiC—10TaN—20Cr$_3$C$_2$ | $(Ti_{0.83}Ta_{0.05}Cr_{0.12})(C_{0.95}N_{0.05})_{0.96}$ |
| | 18 | 50TiC—9Ti—10Cr$_3$C$_2$ | $(Ti_{0.95}Cr_{0.05})C_{0.69}$ |
| | 19 | 60TiC—10TaN—20Cr$_3$C$_2$ | $(Ti_{0.85}Ta_{0.04}Cr_{0.11})(C_{0.96}N_{0.04})_{0.96}$ |
| Comparison 3 | 1 | 50TiC—20TaN | $(Ti_{0.89}Ta_{0.11})(C_{0.45}N_{0.55})_{1.00}$ |
| | 2 | 40TiC—30TiB$_2$—10WB | $(Ti_{0.94}W_{0.06})(C_{0.44}B_{0.56})_{1.34}$ |
| | 3 | 40TiC—5Ta | $(Ti_{0.92}Ta_{0.08})(C_{1.00})_{0.92}$ |
| | 4 | 30TiC—10TiCN—5V | $(Ti_{0.77}V_{0.23})(C_{0.88}N_{0.12})_{0.77}$ |
| | 5 | 40TiC—30ZrO$_2$—10TaN | $(Ti_{0.76}Zr_{0.18}Ta_{0.06})(C_{0.64}N_{0.05}O_{0.31})_{1.18}$ |
| | 6 | 40TiC—10Ta—20Mo | $(Ti_{0.56}Ta_{0.09}Mo_{0.35})(C_{1.0})_{0.56}$ |
| | 7 | TiC—TiN System Cermet | |

| Sample Nos. | | $(Ti_aM_b)(C_cN_dO_eB_f)_g$ (wt %) | $_2O_3$ (wt %) | SiC Whisker (wt %) | Sintering Aids (wt %) | | Sintering Method | Sintering Temp. (°C.) | Relative Theoretical Density (%) |
|---|---|---|---|---|---|---|---|---|---|
| Example 3 | 1 | 58 | 25 | α 20 | MgO | 1 | H·P | 1850 | 99 |
| | | | | | Dy$_2$O$_3$ | 1 | | | |
| | 2 | 53 | 20 | α 20 | MgO | 1 | " | 1850 | 99 |
| | | | | | Y$_2$O$_3$ | 2 | | | |
| | 3 | 87 | — | α 10 | Dy$_2$O$_3$ | 3 | " | 1800 | 99 |
| | 4 | 63 | 4 | α 30 | Ho$_2$O$_3$ | 3 | " | 1900 | 99 |
| | 5 | 68 | 15 | α 15 | CaO | 1 | " | 1850 | 99 |
| | | | | | Ho$_2$O$_3$ | 1 | | | |
| | 6 | 53 | 12 | β 30 | Y$_2$O$_3$ | 5 | " | 1900 | 99 |
| | 7 | 48 | 11 | α 37 | CaO | 2 | " | 1900 | 98 |
| | | | | | Y$_2$O$_3$ | 2 | | | |
| | 8 | 63 | 15 | β 20 | MgO | 2 | " | 1850 | 99 |
| | 9 | 68 | 15 | α 8 | CaO | 4 | N·S | 1800 | 97 |
| | | | | | Dy$_2$O$_3$ | 5 | | | |
| | 10 | 55 | 18 | α 25 | CaO | 1 | H·P | 1900 | 99 |
| | | | | | Y$_2$O$_3$ | 1 | | | |
| | 11 | 85 | 2 | α 10 | Y$_2$O$_3$ | 3 | " | 1800 | 100 |
| | 12 | 71 | 15 | α 10 | Dy$_2$O$_3$ | 4 | HIP | 1750 | 98 |
| | 13 | 80 | — | α 18 | SiO$_2$ | 2 | H·P | 1850 | 99 |
| | 14 | 63 | 18 | α 15 | CaO | 1 | " | 1800 | 98 |
| | | | | | Dy$_2$O$_3$ | 3 | | | |
| | 15 | 66 | 17 | β 15 | NiO | 1 | " | 1850 | 99 |
| | | | | | Y$_2$O$_3$ | 1 | | | |
| | 16 | 58 | 18 | α 20 | N | 2 | " | 1850 | 99 |
| | | | | | Dy$_2$O$_3$ | 2 | | | |
| | 17 | 58 | 21 | α 20 | Dy$_2$O$_3$ | 1 | " | 1850 | 99 |
| | 18 | 85 | — | α 15 | — | | HIP | 1750 | 99 |
| | 19 | 68 | 15 | β 15 | MgO | 1 | H·P | 1800 | 99 |
| | | | | | Dy$_2$O$_3$ | 1 | | | |
| | 20 | 90 | — | β 10 | — | | H·P | 1800 | 99 |
| Comparison 3 | 1 | 70 | 13 | α 15 | MgO | 1 | H·P | 1850 | 99 |
| | | | | | Y$_2$O$_3$ | 1 | | | |
| | 2 | 80 | 6 | α 10 | CaO | 2 | " | 1800 | 97 |
| | | | | | Y$_2$O$_3$ | 2 | | | |
| | 3 | 45 | 6 | β 45 | CaO | 2 | " | 1900 | 96.3 |
| | | | | | Y$_2$O$_3$ | 2 | | | |
| | 4 | 45 | 45 | α 8 | CaO | 1 | " | 1800 | 100 |
| | | | | | N | 1 | | | |
| | 5 | 80 | 7 | α 10 | SiO$_2$ | 1 | " | 1800 | 99 |
| | | | | | Dy$_2$O$_3$ | 2 | | | |
| | 6 | 70 | 17 | α 10 | Y$_2$O$_3$ | 3 | " | 1800 | 99 |
| | 7 | | | | | | — | — | — |

TEST EXAMPLES 1 to 3

By use of the sintered bodies in the abovementioned Example 1 and Comparative Example 1, the cutting tests were conducted.

The test conditions and the test results are shown in the following Tables 5 and 6, respectively.

TABLE 5

|  | 1 | 2 | 3 |
|---|---|---|---|
| Work | FCD55 (HB230) | FCD55 (HB230) | FCD55 (HB230) |
| Cutting Speed (m/min) | 230 | 100 | 600 |
| Rate of Feed (mm/rev) | 0.2 | 0.2 | 0.2 |
| Depth of Cut (mm) | 0.5 | 0.5 | 0.5 |
| Evaluation of Tool Life | Flank wear after passage 4 min. $V_B$ (mm) | Flank wear after passage 20 min. $V_B$ (mm) | Flank wear after passage 1 min. $V_B$ (mm) |

TABLE 6

| | | Test | | (see Table 1) |
|---|---|---|---|---|
| Sample Nos. | | 1 $V_B$ (mm) | 2 $V_B$ (mm) | 3 $V_B$ (mm) |
| Example 1 | 1 | 0.24 | 0.14 | 0.30 |
| | 2 | 0.24 | 0.15 | 0.31 |
| | 3 | 0.27 | 0.17 | 0.25 |
| | 4 | 0.22 | 0.14 | 0.28 |
| | 5 | 0.21 | 0.08 | 0.14 |
| | 6 | 0.17 | 0.06 | 0.12 |
| | 7 | 0.19 | 0.10 | 0.13 |
| | 8 | 0.21 | 0.09 | 0.14 |
| | 9 | 0.19 | 0.10 | 0.13 |
| | 10 | 0.19 | 0.11 | 0.18 |
| | 11 | 0.24 | 0.18 | 0.28 |
| | 12 | 0.25 | 0.14 | 0.20 |
| | 13 | 0.18 | 0.09 | 0.12 |
| | 14 | 0.20 | 0.11 | 0.13 |
| | 15 | 0.19 | 0.10 | 0.12 |
| | 16 | 0.20 | 0.11 | 0.13 |
| | 17 | 0.21 | 0.13 | 0.16 |
| | 18 | 0.25 | 0.16 | 0.21 |
| Comparison 1 | 1 | 0.45 | 0.42 | Fracture after 10 sec. |
| | 2 | Fracture after 10 sec. | Fracture after 10 sec. | Fracture after 10 sec. |
| | 3 | Fracture after 10 sec. | Fracture after 10 sec. | Fracture after 10 sec. |
| | 4 | Fracture after 10 sec. | Fracture after 10 sec. | Fracture after 10 sec. |
| | 5 | Fracture after 10 sec. | Fracture after 10 sec. | Fracture after 10 sec. |
| | 6 | Fracture after 10 sec. | Fracture after 10 sec. | Fracture after 10 sec. |
| | 7 | Fracture after 10 sec. | Fracture after 10 sec. | Fracture after 10 sec. |
| | 8 | Fracture after 10 sec. | Fracture after 10 sec. | Fracture after 10 sec. |
| | 9 | Fracture after 1 min. | 0.18 | Fracture after 20 sec. |

From the above Table 6, it will be seen that the sintered bodies of Example 1 above according to the present invention is excellent in its anti-chipping property in comparison with that of the Comparative Example 1, hence its cutting life can be prolonged.

TEST EXAMPLES 4 AND 5

By use of the sintered bodies of the abovementioned Example 2 and Comparative Example 2, the cutting tests were conducted.

The test conditions and the test results are respectively shown in the following Tables 7 and 8.

The works to be cut of Test Example 4 are in a columnar shape as shown in FIG. 1, which has a length of 400 mm and a diameter of 150 mm, and in which six grooves (1), each having a breadth of 5 mm, are formed along the longitudinal direction at an equal space interval among them. On the other hand, the works to be cut of Test Example 5 are of a columnar shape having a length of 200 mm and a diameter of 240 mm.

TABLE 7

|  | Test | |
|---|---|---|
|  | 1 | 2 |
| Work | FCD70(HB280) | FCD45(HB180) |
| Cutting Speed (m/min) | 200 | 350 |
| Rate of Feed (mm/rev) | 0.6 | 0.2 |
| Depth of Cut (mm) | 2 | 0.5 |
| Cutting Oil | Water Soluble | — |
| Evaluation of Tool Life | Shock count till fracture | Flank wear after passage of 8 min. $V_B$ (mm) |

TABLE 8

| | | Test | |
|---|---|---|---|
| Sample Nos. | | 4 count | 5 $V_B$ (mm) |
| Example 2 | 1 | 700 | 0.28 |
| | 2 | 900 | 0.26 |
| | 3 | 2800 | 0.20 |
| | 4 | 3000 | 0.21 |
| | 5 | 4500 | 0.15 |
| | 6 | 4800 | 0.27 |
| | 7 | 3000 | 0.16 |
| | 8 | 5000 | 0.22 |
| | 9 | 4000 | 0.17 |
| | 10 | 2100 | 0.19 |
| | 11 | 2800 | 0.23 |
| | 12 | 3700 | 0.18 |
| | 13 | 3100 | 0.26 |
| | 14 | 3500 | 0.18 |
| | 15 | 3200 | 0.24 |
| | 16 | 3000 | 0.23 |
| Comparison 2 | 1 | 600 | 0.29 |
| | 2 | 600 | 0.28 |
| | 3 | 1300 | 0.31 |
| | 4 | 5000 | 0.74 |
| | 5 | 2800 | 0.48 |
| | 6 | 300 | 0.22 |
| | 7 | 100 | 0.46 |
| | 8 | 20 | 0.37 |

TEST EXAMPLES 6 AND 7

By use of the sintered bodies of the above mentioned Example 3 and Comparative Example 3, the cutting tests were conducted.

The test conditions and test results are respectively shown in the following Tables 9 and 10.

TABLE 9

|  | Test | |
|---|---|---|
|  | 4 | 5 |
| Work | FCD70(HB280) | FCD45(HB180) |
| Cutting Speed (m/min) | 150 | 450 |
| Rate of Feed (mm/rev) | 0.6 | 0.2 |
| Depth of Cut (mm) | 1 | 0.5 |
| Cutting Oil | Water Soluble | — |
| Evaluation of Tool Life | Shock count till fracture | Flank wear after passage of 8 min. $V_B$ (mm) |

TABLE 10

|  |  | Test | |
|---|---|---|---|
|  |  | 6 | 7 |
| Sample Nos. |  | count | $V_B$ (mm) |
| Example 3 | 1 | 7000 | 0.25 |
|  | 2 | 6800 | 0.26 |
|  | 3 | 6000 | 0.28 |
|  | 4 | 7000 | 0.33 |
|  | 5 | 6400 | 0.21 |
|  | 6 | 7600 | 0.29 |
|  | 7 | 8200 | 0.34 |
|  | 8 | 5300 | 0.27 |
|  | 9 | 1800 | 0.35 |
|  | 10 | 6900 | 0.29 |
|  | 11 | 5000 | 0.28 |
|  | 12 | 3000 | 0.33 |
|  | 13 | 7100 | 0.30 |
|  | 14 | 3400 | 0.31 |
|  | 15 | 7000 | 0.23 |
|  | 16 | 7300 | 0.26 |
|  | 17 | 3500 | 0.35 |
|  | 18 | 5000 | 0.30 |
|  | 19 | 4300 | 0.31 |
| Comparison 3 | 1 | 4800 | 0.58 |
|  | 2 | 900 | 0.25 |
|  | 3 | 3700 | 0.86 |
|  | 4 | 1000 | 0.33 |
|  | 5 | 1500 | 0.41 |
|  | 6 | 700 | Fracture |
|  | 7 | 7000 | 0.61 |

What is claimed is:

1. A process for producing a TiC-base/SiC whisker composite ceramic comprising:

(1) providing a powdery base mixture consisting essentially of 5 to 40% by weight SiC whisker, 10% by weight or below of a sintering aid, and the balance being a TiC-base composition represented by the following formula in atomic fraction: $(Ti_aM_b)$ $(C_cN_dO_eB_f)_g$ where:

M denotes at least one of transition metal elements of Groups IVa, Va and VIa, except Ti, according to the International Periodic Table; and a+b=1, 0<b≦0.5, c+d+e+f=1, 0.5≦c≦1.0, 0≦d≦0.5, 0≦e≦0.3, 0≦f≦0.5, 0.6≦g≦1.1;

(b) thoroughly mixing said mixture to uniformly disperse the SiC whisker therein;

(c) compacting and sintering the resultant mixture in a nonoxidizing atmosphere at a temperature of 1,500°–2,000° C.

2. The process as set forth in claim 1, wherein said mixing is carried out until the SiC whisker attains a length of 1–20 μm.

3. The process as defined in claim 2, wherein said sintering is carried out until the resulting ceramic attains higher impact resistance and higher resistance against wear than a ceramic consisting essentially of 40% by weight or more of TiC and 5 to 40% by weight of SiC whiskers of a length greater than 20 microns dispersed in said ceramic.

4. The process as defined in claim 3, wherein said impact resistance and resistance against wear are determined by a cutting test using the ceramic as a cutting tool and a difficult to cut material as a work, said work having a columnar shape having grooves formed along the longitudinal direction at a cutting speed of 100 to 600 m/min.

5. The process as defined in claim 4, wherein said work is a ductile cast iron selected from the group consisting of FCD55 grade, FCD70 grade and FCD45 grade.

6. The process as set forth in claim 1, wherein said sintering is effected at 1,700°–2,000° C.

7. The process as set forth in claim 1, wherein said sintering is effected at 1,700°–1,900° C.

8. The process as set forth in claim 1, wherein said mixture further comprises $Al_2O_3$ of no more than 40% by weight of the mixture.

9. The process as defined in claim 8, wherein said TiC-base composition comprises at least 40% by weight of the base mixture.

10. The process as set forth in claim 1, wherein said sintering aid is at least one selected from the group consisting of AlN and oxides of Mg, Ca, Si, Ni, Y and rare earth metals.

11. The process as set forth in claim 1, wherein the sintering aid is selected from oxides selected from the group consisting of oxides of Mg, Fa, Si, Ni, Y and rare earth metals.

12. The process as set forth in claim 1, wherein said TiC-base composition consists essentially of a combination selected from the group consisting of TiC; said transition metal elements and carbide, nitride, boride and oxide thereof and solid solution of these compounds; and B.

13. The process as set forth in claim 12, wherein said TiC-base composition includes metallic Ti and the sintering is effected until the metallic Ti cannot be detected as a metallic phase by X-ray diffractometry.

14. The process as set forth in claim 13, wherein said metallic Ti replaces the TiC in an amount of no more than 30% by weight of the TiC.

15. The process as defined in claim 1, wherein the SiC whisker has a diameter of 0.2–1.5 μm.

16. The process as defined in claim 1, wherein said mixing is carried out until the SiC whisker attains a length of 1–10 μm.

17. The process as defined in claim 1, wherein said mixing is carried out until the SiC whisker attains a maximum length of 7–9 μm.

18. The process as defined in claim 1, wherein said transition metal element is selected from the group consisting of Zr, Hf, V, Nb, Ta, Cr, Mo and W.

19. The process as defined in claim 1, wherein said mixing is carried out by ball milling.

* * * * *